US010576893B1

(12) United States Patent
Salter et al.

(10) Patent No.: US 10,576,893 B1
(45) Date of Patent: Mar. 3, 2020

(54) VEHICLE LIGHT ASSEMBLY (71) Applicant: Ford Global Technologies, LLC, Dearborn, MI (US)

(72) Inventors: Stuart C. Salter, White Lake, MI (US); Paul Kenneth Dellock, Northville, MI (US); Annette Lynn Huebner, White Lake, MI (US); Keith Hoelscher, Northville, MI (US); Craig Willbanks, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 16/154,014

(22) Filed: Oct. 8, 2018

(51) Int. Cl.
*B60R 1/00* (2006.01)
*G03B 17/54* (2006.01)
*G03B 21/14* (2006.01)
*G03B 21/20* (2006.01)
*B60K 35/00* (2006.01)

(52) U.S. Cl.
CPC ............ *B60R 1/001* (2013.01); *G03B 17/54* (2013.01); *G03B 21/145* (2013.01); *G03B 21/2033* (2013.01); *B60K 35/00* (2013.01); *B60K 2370/15* (2019.05); *B60K 2370/1531* (2019.05); *B60K 2370/188* (2019.05); *B60K 2370/21* (2019.05); *B60K 2370/29* (2019.05); *B60K 2370/33* (2019.05); *B60K 2370/333* (2019.05); *B60K 2370/334* (2019.05); *B60R 2300/207* (2013.01)

(58) Field of Classification Search
CPC ...... B60R 1/001; G03B 17/54; G03B 21/145; G03B 21/2033; B60K 2370/1531; B60K 2370/15; B60K 2370/29; B60K 2370/188; B60K 2370/33; B60K 2370/21; B60K 2370/333; B60K 2370/334; B60K 35/00; B60K 2300/207
See application file for complete search history.

(56) References Cited

U.S. PATENT DOCUMENTS

| 2,486,859 | A | 11/1949 | Meijer et al. |
| 5,053,930 | A | 10/1991 | Benavides |
| 5,434,013 | A | 7/1995 | Fernandez |
| 5,709,453 | A | 1/1998 | Krent et al. |
| 5,839,718 | A | 11/1998 | Hase et al. |
| 6,031,511 | A | 2/2000 | DeLuca et al. |
| 6,117,362 | A | 9/2000 | Yen et al. |

(Continued)

FOREIGN PATENT DOCUMENTS

| CN | 101337492 A | 1/2009 |
| CN | 201169230 Y | 2/2009 |

(Continued)

*Primary Examiner* — Sejoon Ahn
(74) *Attorney, Agent, or Firm* — David Coppiellie; Price Heneveld LLP (57) ABSTRACT

An illumination assembly for a vehicle is provided herein. The illumination assembly may employ a projection assembly that may be disposed within a housing extending from a portion of a vehicle. A window is disposed on the vehicle and may be optically coupled with the projection assembly. A luminescent structure may be disposed within the window and is excited by the projection assembly. A controller may be configured to activate the projection assembly to selectively illuminate indicia on the window.

15 Claims, 6 Drawing Sheets

(56) References Cited

U.S. PATENT DOCUMENTS

| | | |
|---|---|---|
| 6,294,990 B1 | 9/2001 | Knoll et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,347,576 B2 | 3/2008 | Wang et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,187,034 B2 | 11/2015 | Tarahomi et al. |
| 9,272,708 B2 | 3/2016 | Cuddihy et al. |
| 9,299,887 B2 | 3/2016 | Lowenthal et al. |
| 9,315,148 B2 | 4/2016 | Schwenke et al. |
| 9,452,709 B2 | 9/2016 | Aburto Crespo |
| 9,568,659 B2 | 2/2017 | Verger et al. |
| 9,616,812 B2 | 4/2017 | Sawayanagi |
| 2002/0011925 A1* | 1/2002 | Hahn .................... B60K 35/00 340/425.5 |
| 2002/0159741 A1 | 10/2002 | Graves et al. |
| 2002/0163792 A1 | 11/2002 | Formoso |
| 2003/0116077 A1* | 6/2003 | Bucalo .................... B60Q 1/44 116/36 |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0242229 A1* | 10/2007 | Kim ..................... G03B 21/006 353/31 |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2008/0236007 A1 | 10/2008 | Au et al. |
| 2008/0258888 A1* | 10/2008 | Kubota .................... B60R 1/00 340/436 |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0187547 A1* | 8/2011 | Kweon ................. B60K 35/00 340/670 |
| 2011/0265360 A1 | 11/2011 | Podd et al. |
| 2012/0001406 A1 | 1/2012 | Paxton et al. |
| 2012/0019441 A1* | 1/2012 | Ueno .................... G03B 21/142 345/156 |
| 2012/0019781 A1* | 1/2012 | Kuhlman ............... B60K 35/00 353/13 |
| 2012/0104954 A1 | 5/2012 | Huang |
| 2012/0146919 A1* | 6/2012 | Kim ..................... G06F 3/044 345/173 |
| 2012/0183677 A1 | 7/2012 | Agrawal et al. |
| 2012/0188196 A1* | 7/2012 | Liu ....................... G06F 3/044 345/174 |
| 2012/0280528 A1 | 11/2012 | Dellock et al. |
| 2013/0027781 A1* | 1/2013 | Eckardt ................. B60K 35/00 359/630 |
| 2013/0050979 A1 | 2/2013 | Van De Ven et al. |
| 2013/0092965 A1 | 4/2013 | Kijima et al. |
| 2013/0120850 A1* | 5/2013 | Lambert ............ G02B 27/0101 359/630 |
| 2013/0335212 A1* | 12/2013 | Purks .................... B60Q 1/34 340/435 |
| 2013/0335994 A1 | 12/2013 | Mulder et al. |
| 2014/0003044 A1 | 1/2014 | Harbers et al. |
| 2014/0022208 A1* | 1/2014 | Wu ..................... H03K 17/9622 345/174 |
| 2014/0029281 A1 | 1/2014 | Suckling et al. |
| 2014/0040016 A1 | 2/2014 | Amla et al. |
| 2014/0065442 A1 | 3/2014 | Kingsley et al. |
| 2014/0078414 A1* | 3/2014 | Lee ...................... G06F 3/041 349/12 |
| 2014/0103258 A1 | 4/2014 | Agrawal et al. |
| 2014/0211498 A1 | 7/2014 | Cannon et al. |
| 2014/0244385 A1 | 8/2014 | Choi et al. |

(56) References Cited

U.S. PATENT DOCUMENTS

| | | |
|---|---|---|
| 2014/0264396 A1 | 9/2014 | Lowenthal et al. |
| 2014/0266666 A1 | 9/2014 | Habibi |
| 2014/0293430 A1* | 10/2014 | Takahashi ............ G03B 21/005 359/630 |
| 2014/0351054 A1 | 11/2014 | Ahn et al. |
| 2014/0354692 A1* | 12/2014 | Ng-Thow-Hing ........................... G02B 27/0101 345/633 |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0123817 A1* | 5/2015 | Almalki ................ F03D 9/00 340/907 |
| 2015/0138789 A1 | 5/2015 | Singer et al. |
| 2015/0267881 A1 | 9/2015 | Salter et al. |
| 2015/0294363 A1 | 10/2015 | Bhola et al. |
| 2015/0307033 A1 | 10/2015 | Preisler et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236612 A1* | 8/2016 | Caron ................ G09F 27/005 |
| 2016/0236613 A1 | 8/2016 | Trier |
| 2016/0240794 A1 | 8/2016 | Yamada et al. |
| 2017/0158125 A1 | 6/2017 | Schuett et al. |
| 2017/0160626 A1* | 6/2017 | Muramatsu ............ G01S 17/023 |
| 2017/0208668 A1* | 7/2017 | Kramer ............... H05B 37/0272 |
| 2017/0253179 A1 | 9/2017 | Kumada |
| 2018/0004020 A1* | 1/2018 | Kunii ................ G02F 1/1336 |
| 2018/0278900 A1* | 9/2018 | Wakimoto ............ G06F 3/0416 |
| 2019/0016254 A1* | 1/2019 | Salter .................. F21V 7/0083 |
| 2019/0096297 A1* | 3/2019 | Cary ................... G09F 19/18 |

FOREIGN PATENT DOCUMENTS

| | | |
|---|---|---|
| CN | 201193011 Y | 2/2009 |
| CN | 204127823 U | 1/2015 |
| CN | 206741879 U | 12/2017 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

* cited by examiner

VEHICLE LIGHT ASSEMBLY

FIELD OF THE INVENTION

The present disclosure generally relates to vehicle lamp assemblies, and more particularly, to vehicle lamp assemblies disposed on an exterior portion of a vehicle.

BACKGROUND OF THE INVENTION

Vehicle illumination may provide a wide range of functions for an occupant of the vehicle. It is therefore desired to implement such structures in vehicles for various applications.

SUMMARY OF THE INVENTION

According to one aspect of the present disclosure, an illumination assembly is provided herein. The illumination assembly includes a projection assembly disposed within a housing extending from a portion of a vehicle. A window is disposed on the vehicle and optically coupled with the projection assembly. A luminescent structure is disposed within the window and excited by the projection assembly. A controller is configured to activate the projection assembly to selectively illuminate indicia on the window.

According to another aspect of the present disclosure, an illumination assembly is provided herein. The illumination assembly includes a projection assembly disposed within a housing disposed on an exterior portion of a vehicle. The projection assembly is activated when an approaching vehicle passes the illumination assembly below a predefined speed. A window is disposed on the vehicle and optically coupled with the projection assembly. A luminescent structure is disposed within the window and excited by the projection assembly.

According to yet another aspect of the present disclosure, an illumination assembly is provided herein. The illumination assembly includes a window optically coupled with a projection assembly. A luminescent structure is disposed within the window and excited by the projection assembly. A controller is configured to activate the projection assembly to selectively illuminate indicia on the window in a first orientation when the vehicle is unoccupied and a second, opposing orientation when the vehicle is occupied.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 2:
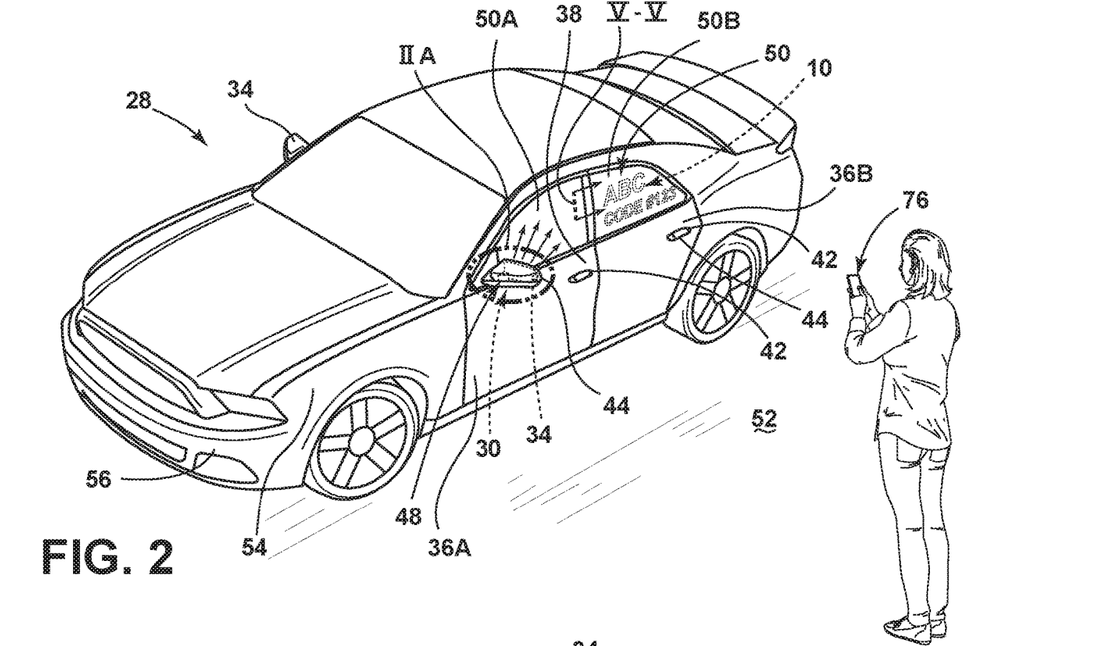
FIG. 2 is a front perspective view of a vehicle employing an illumination assembly in an exterior member, according to some examples.

For purposes of description herein, the terms "upper," "lower," "right," "left," "rear," "front," "vertical," "horizontal," "inward," "outward," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illumination assembly for a vehicle. The illumination assembly may employ a projection assembly that may be disposed within a housing extending from a portion of a vehicle. A window is disposed on the vehicle and may be optically coupled with the projection assembly. A luminescent structure may be disposed within the window and is excited by the projection assembly. A controller may be configured to activate the projection assembly to selectively illuminate indicia on the window. The vehicle may further employ one or more luminescent structures that illuminate in response to predefined events. The one or more luminescent structures may be configured to receive an excitation light and re-emit a converted light at a different wavelength typically found in the visible wavelength spectrum.

Figure 1A:
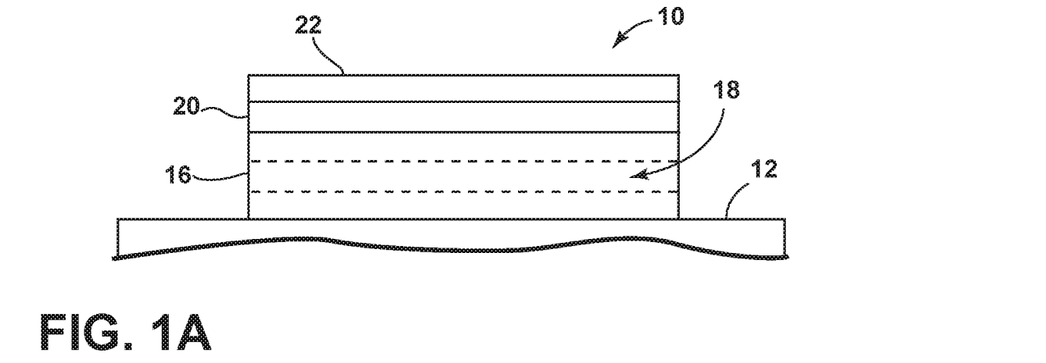
FIG. 1A is a side view of a luminescent structure rendered as a coating, according to some examples.
Figure 1B:
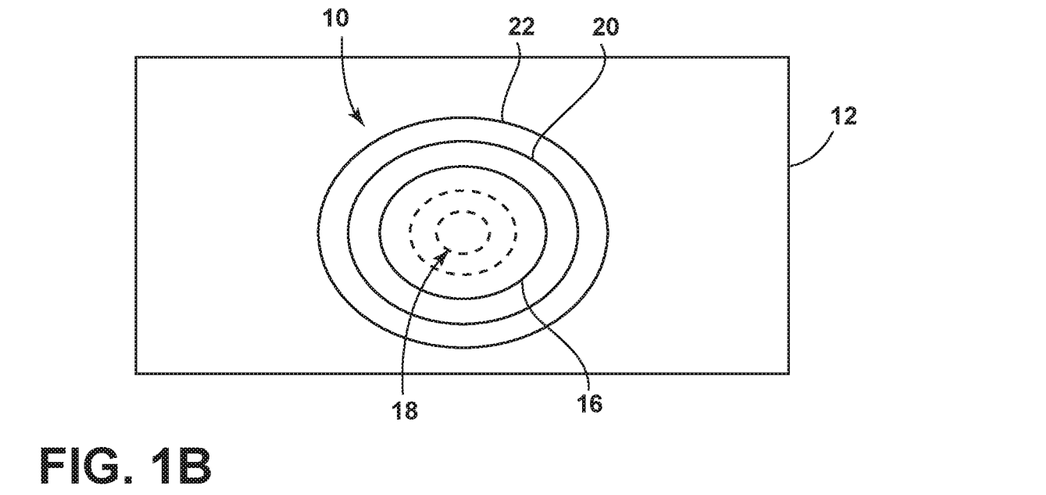
FIG. 1B is a top view of a luminescent structure rendered as a discrete particle, according to some examples.
Figure 1C:
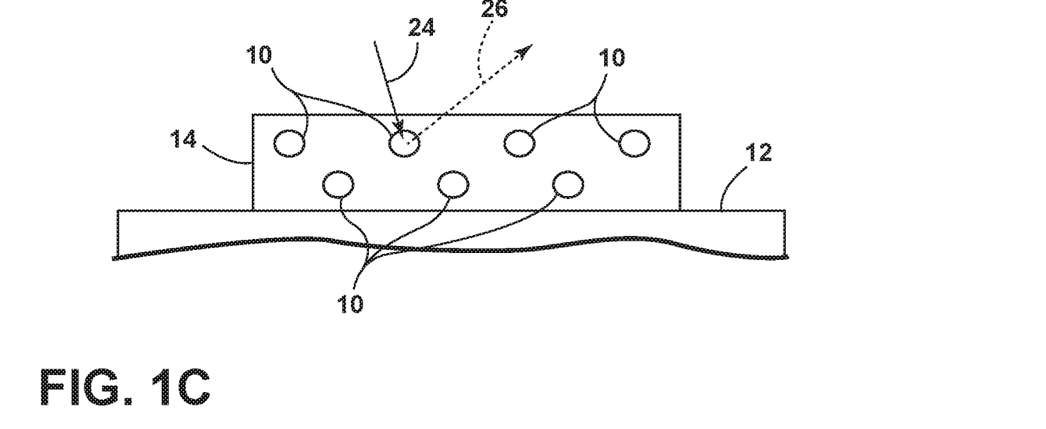
FIG. 1C is a side view of a plurality of luminescent structures rendered as discrete particles and incorporated into a separate structure.

Referring to FIGS. 1A-1C, various exemplary embodiments of luminescent structures 10 are shown, each capable of being coupled to a substrate 12, which may correspond to a vehicle fixture or vehicle-related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown through broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the luminescent structure 10. Conversely, under the principle of up conversion, the excitation light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

Light emitted by a light source 40 (FIG. 2A) may be referred to herein as excitation light 24 and is illustrated herein as solid arrows. In contrast, light emitted from the luminescent structure 10 may be referred to herein as converted light 26 and may be illustrated herein as broken arrows to represent the luminescence.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In various embodiments, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

According to various embodiments, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the luminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

According to various embodiments, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in various embodiments, the rare earth aluminum garnet type Ce phosphor may serve as the luminescent material 18 with ultra-short-persistence characteristics, which can emit the converted light 26 by absorbing purple to blue excitation light 24 emitted from the light source 40. According to various embodiments, a ZnS:Ag phosphor may be used to create a blue-converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short-persistence luminescent material known in the art may be utilized without departing from the teachings provided herein.

Additionally, or alternatively, the luminescent material 18, according to various embodiments, disposed within the luminescent structure 10 may include a long-persistence luminescent material 18 that emits the converted light 26, once charged by the excitation light 24. The excitation light 24 may be emitted from any excitation source (e.g., any natural light source, such as the sun, and/or any artificial light source 40). The long-persistence luminescent material 18 may be defined as having a long decay time due to its ability to store the excitation light 24 and release the converted light 26 gradually, for a period of several minutes or hours, once the excitation light 24 is no longer present.

The long-persistence luminescent material 18, according to various embodiments, may be operable to emit light at or above an intensity of 0.32 mcd/m$^2$ after a period of 10 minutes. Additionally, the long-persistence luminescent material 18 may be operable to emit light above or at an intensity of 0.32 mcd/m$^2$ after a period of 30 minutes and, in various embodiments, for a period substantially longer than 60 minutes (e.g., the period may extend 24 hours or longer, and in some instances, the period may extend 48 hours). Accordingly, the long-persistence luminescent material 18 may continually illuminate in response to excitation from any light source 40 that emit the excitation light 24, including, but not limited to, natural light source (e.g., the sun) and/or any artificial light source 40. The periodic absorption of the excitation light 24 from any excitation source may provide for a substantially sustained charge of the long-persistence luminescent material 18 to provide for consistent passive illumination. In various embodiments, a light sensor 80 may monitor the illumination intensity of the luminescent structure 10 and actuate an excitation source when the illumination intensity falls below 0.32 mcd/m$^2$, or any other predefined intensity level.

The long-persistence luminescent material 18 may correspond to alkaline earth aluminates and silicates, for example, doped di-silicates, or any other compound that is capable of emitting light for a period of time once the excitation light 24 is no longer present. The long-persistence luminescent material 18 may be doped with one or more ions, which may correspond to rare earth elements, for example, Eu2+, Tb3+, and/or Dy3. According to one non-limiting exemplary embodiment, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to various embodiments, may be a translucent white color, and in some instances reflective, when unilluminated. Once the luminescent structure 10 receives the excitation light 24 of a particular wavelength, the luminescent structure 10 may emit any color light (e.g., blue or red) therefrom at any desired brightness. According to various embodiments, a blue emitting phosphorescent material may have the structure $Li_2ZnGeO_4$ and may be prepared by a high-temperature solid-state reaction method or through any other practicable method and/or process. The afterglow may last for a duration of 2-8 hours and may originate from the excitation light 24 and d-d transitions of Mn2+ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

With further reference to FIGS. 1A-1C, according to various embodiments, the luminescent material 18 may include one or more quantum dots. Quantum dots are nanoscale semiconductor devices that tightly confine either electrons or electron holes in three spatial dimensions and may be luminescent. The luminescence of a quantum dot can be manipulated to specific wavelengths by controlling the particle diameter of the quantum dots. Quantum dots may have a radius, or a distance half of their longest length, in the range of between about 1 nm and about 10 nm, or between about 2 nm and about 6 nm. Larger quantum dots (e.g., radius of 5-6 nm) emit longer wavelength light resulting in the color of the light being such colors as orange or red. Smaller quantum dots (e.g., radius of 2-3 nm) emit shorter wavelengths resulting in colors such as blue and green. It will be understood that the wavelength of light emitted from the quantum dots may vary depending on the composition of the quantum dots. Quantum dots naturally produce monochromatic light. Exemplary compositions of the quantum dots include $LaF_3$ quantum dot nanocrystals that are doped (e.g., coated) with Yb—Er, Yb—Ho and/or Yb—Tm. Other types of quantum dots that can be used include various types of tetrapod quantum dots and perovskite-enhanced quantum dots. It will be understood that one or more types of quantum dots may be mixed or otherwise used in the luminescent material 18 to achieve a desired color or hue to the converted light 26.

The quantum dot embodiments of the luminescent material 18 may be configured to emit light in response to the excitation light 24. According to various embodiments, the quantum dots may be configured to emit light by up-converting excitation light 24. In up-conversion processes, two or more photons of a longer wavelength excitation light 24 are absorbed. Once absorbed, the quantum dots may emit one or more photons having a shorter wavelength than the wavelengths of the excitation light 24. According to various embodiments, the excitation light 24 may be in the infrared (IR) light spectrum. In such embodiments, the excitation light 24 may have a wavelength of between about 800 nm and about 1000 nm. In one exemplary embodiment, the excitation light 24 may have a wavelength of between 900 and 1000 nm, such as 980 nm. A wavelength between 900 and 1000 nm is chosen since red, blue and green emitting colloidal quantum dots of these species can efficiently absorb this wavelength of excitation light 24. This means the luminescent structure 10 can emit virtually any color of converted light 26, including, but not limited to, converted light 26 within the white spectrum, when charged or excited with IR excitation light 24 and the proper sized quantum dots are used.

Figure 2A:
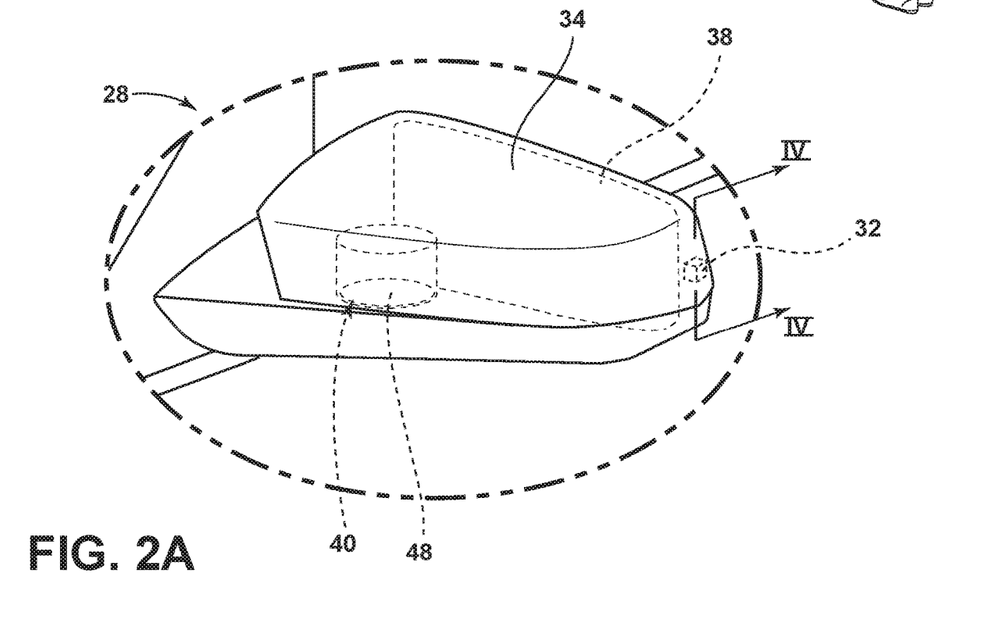
FIG. 2A is an enlarged view of section IIA of FIG. 2 illustrating the exterior member with a plurality of light sources disposed therein.

Referring to FIGS. 2 and 2A, a vehicle 28 is generally illustrated employing an illumination assembly 30 that includes a projection assembly 32, which may be optically coupled with the luminescent structure 10. The vehicle 28 shown is one example of an occupant vehicle 28 having a pair of exterior members 34 mounted on opposing lateral sides of the vehicle 28 generally near the front side of the front occupant doors 36A, which may be configured to house a mirror 38 and/or a sensor assembly 40 therein for detecting nearby objects. It will be appreciated that the exterior member 34 may be disposed in any position along the vehicle 28 without departing from the scope of the present disclosure. The vehicle 28 may also include rear occupant doors 36B that are disposed vehicle rearwardly of the front doors 36A. The doors 36A, 36B may each include a handle 42 with a latch mechanism to enable an occupant to engage and unlatch a latch mechanism to open the door 36A, 36B for access to a cabin. The handle 42 may include a proximity sensor 44, such as a capacitive sensor, for detecting the hand of the occupant in close proximity to the handle 42. However, in some examples, the latch mechanism may be a mechanical latch and/or any other type of latch known in the art. In the depicted example, the vehicle 28 is illustrated as a sedan, but it will be understood that the vehicle 28 may be a truck, van, sports utility vehicle, or any other type of vehicle 28 without departing from the scope of the teachings provided herein.

Figure 6:
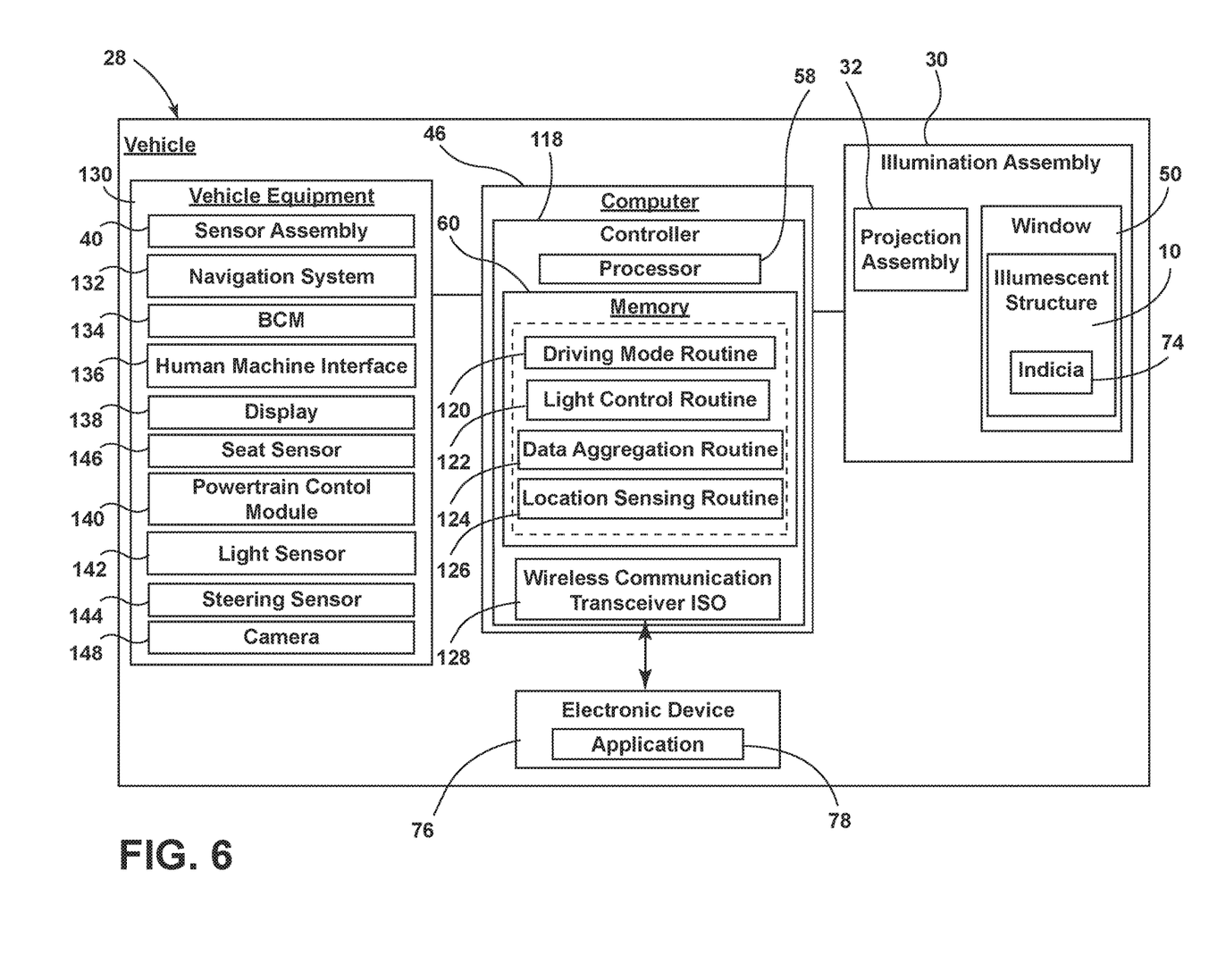
FIG. 6 is a block diagram of a vehicle employing the illumination assembly, according to some examples.

With further reference to FIGS. 2 and 2A, the vehicle 28 may be a manually operated vehicle (i.e. using a human driver) or may be autonomously driven by an onboard computer 46 (FIG. 6). Additionally, or alternatively, the vehicle 28 may be remotely controlled (e.g., via an operator in a different location). Autonomous vehicles sense the environment around them using a variety of sensors and/or computers. In autonomous examples, the sensor assembly 40 may incorporate a light detection and ranging (LIDAR) system 48, or any other practicable system, that measures distance by illuminating a target with laser light. Such laser light may exist in the near-infrared and/or infrared wavelength band of the electromagnetic spectrum. The sensor assembly 40 may additionally, and/or alternatively, include any other type of sensor for detecting objects proximate the vehicle 28, including but not limited to, proximity sensors and/or imaging sensors.

The projection assembly 32 may be installed within the exterior member 34, generally in a position configured to project excitation light 24 towards a window 50 of the vehicle 28, such as a front window 50A disposed within the front door and/or a rear window 50B disposed in the rear door. In some instances, the projection assembly 32 may also project excitation light 24 towards a ground surface 52 proximate the vehicle 28. It will further be appreciated that the projection assembly 32 may be located at different locations on the vehicle 28, such as in the vehicle door handle 42, the door 36A, 36B itself, a side fender 54, a bumper 56, a roof rail or other locations sufficient to project excitation light 24 towards a desired location and/or any position within the vehicle 28.

Figure 3:
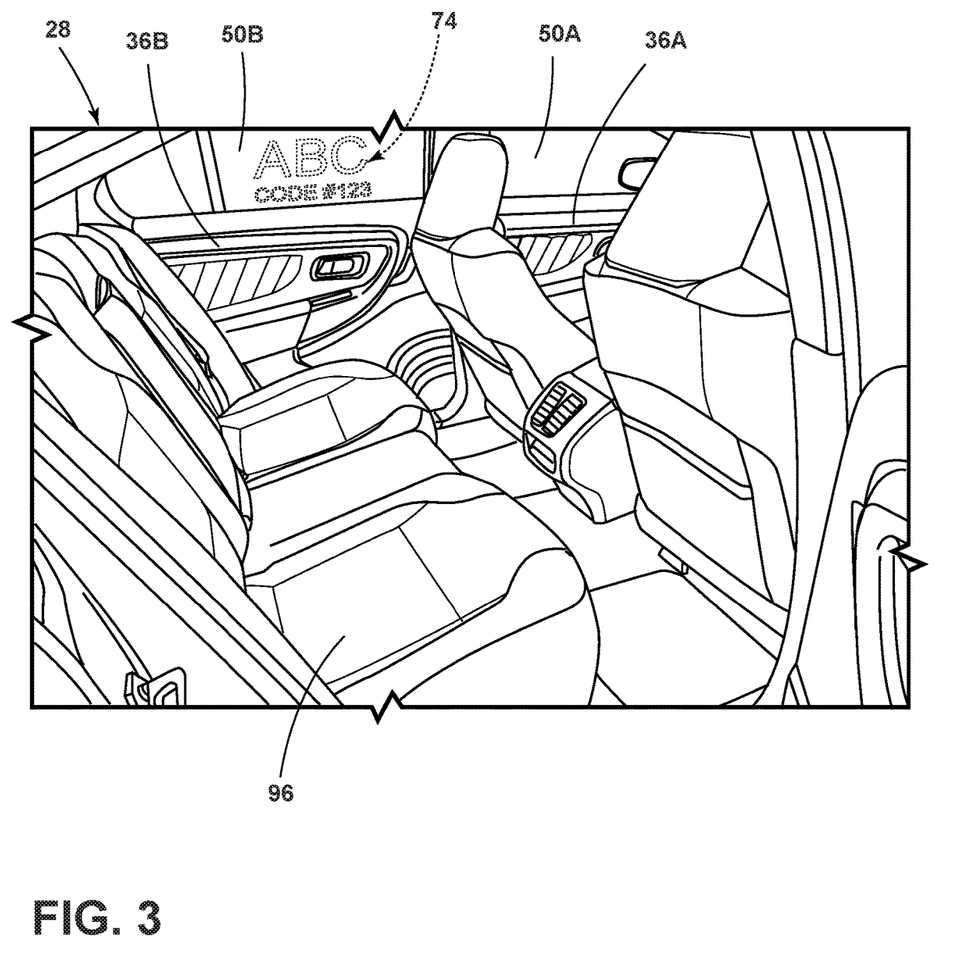
FIG. 3 is a side perspective view of a vehicle cabin and window having illuminated indicia thereon, according to some examples.

Referring to FIGS. 2-3, the projection assembly 32 is controlled by a controller 118 (FIG. 6) to activate one or more light sources 72 (FIG. 4) therein to selectively illuminate the front or rear window 50A, 50B thereby providing indicia 74 to inside and/or outside of the vehicle 28. In some instances, the window 50 may provide outwardly directed indicia 74 when the vehicle 28, and/or rear seat assembly 96, is unoccupied and inwardly directed indicia 74 when the vehicle 28 and/or rear seat is occupied. Accordingly, the indicia 74 on the window 50 is in a first orientation when the vehicle 28 is unoccupied and a second, opposing orientation when the vehicle 28 is occupied.

One or more windows 50 of the vehicle 28 may include the luminescent structure 10 therein. According to some examples, the vehicle 28 may be utilized for commercial purposes and the indicia 74 may notify customers of information about the vehicle 28 and/or a commercial entity or affiliation utilizing the vehicle 28. For example, the indicia 74 may illuminate when the vehicle 28 is being used as a ride-providing (or chauffeuring) vehicle 28 and/or a ride-sharing vehicle 28. In such circumstances, the indicia 74 may notify potential occupants, or customers, of the corporation and/or affiliation of the vehicle 28. Moreover, the indicia 74 may provide various identification characters to ensure that an incoming occupant enters the correct vehicle 28.

In various embodiments, the illumination assembly 30 may illuminate indicia 74 while an electronic device 76 is operating an application 78 (FIG. 6) on the electronic device 76. For example, when the application 78 is operation, the illumination assembly 30 may illuminate indicia 74 correlating to the application 78 on the electronic device 76. When the vehicle 28 operator terminates the application 78, the illumination assembly 30 may return the light source 72 (FIG. 4) to a deactivated state and/or the luminescent structure 10 to a non-luminescent state. The indicia 74 may indicate the company or affiliation of the ride-providing service, occupancy status of the vehicle 28, etc. Moreover, the indicia 74 may provide any additional indicia 74 to an incoming occupant, an occupant disposed within the vehicle 28, and/or persons proximate the vehicle 28 based on various inputs including, but not limited to, indicia 74 about the occupant and/or the location of the vehicle 28.

With further reference to FIG. 3, in some instances, the characters may be readable from a position outwardly of the vehicle 28, as generally illustrated in FIG. 2, when the vehicle 28 is unoccupied, and/or during any other time, and readable from a position within the vehicle 28, as generally illustrated in FIG. 3, when the vehicle 28 is occupied. In some instances, the projection assembly 32 may provide illuminate indicia 74 that is readable from within the vehicle 28 and outwardly of the vehicle 28 simultaneously.

Figure 4:
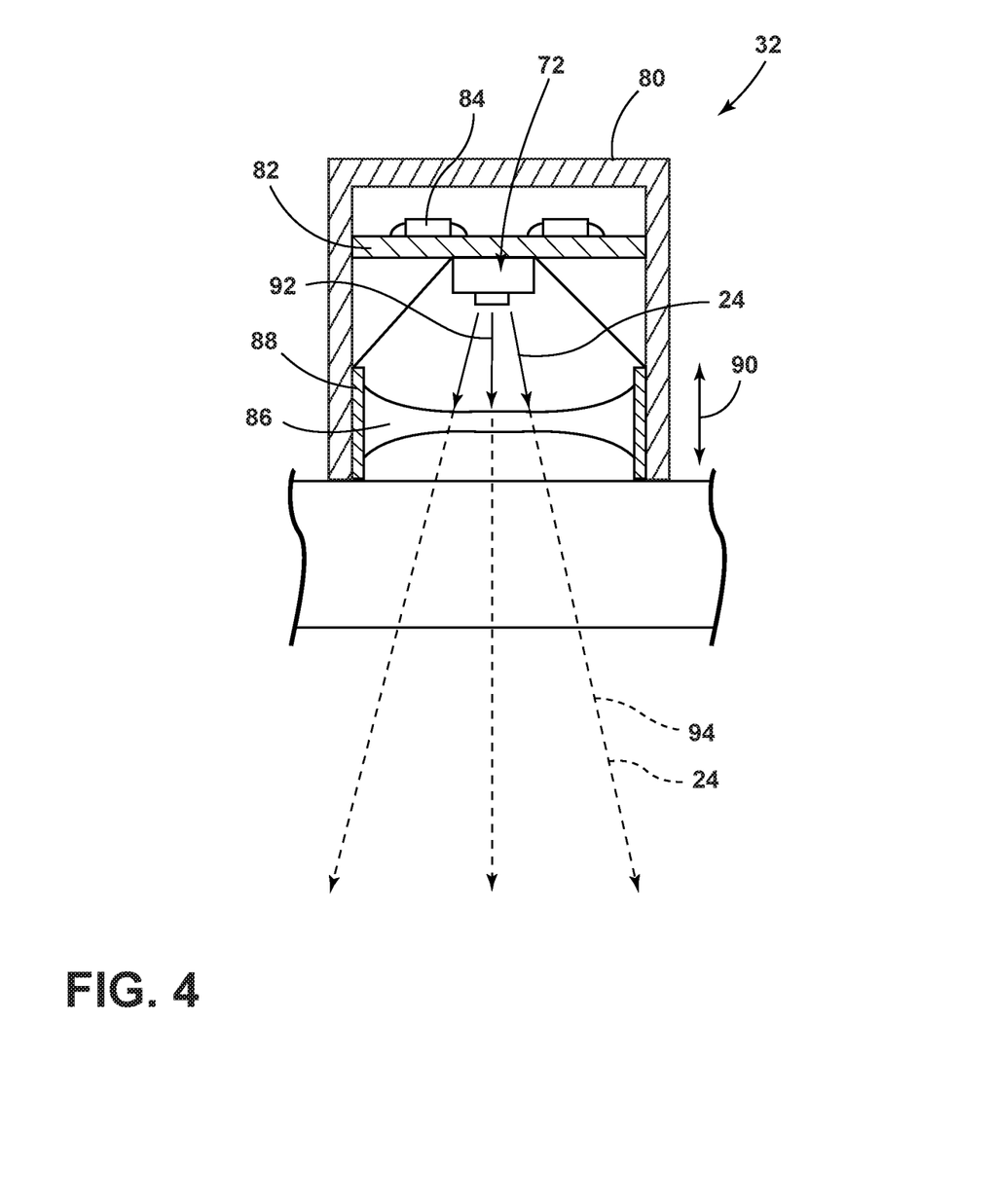
FIG. 4 is a cross-sectional view of a projection assembly taken along the line IV-IV of FIG. 2A.

Referring to FIG. 4, the projection assembly 32 includes a housing 80 that may at least partially surround the light source 72 disposed on a printed circuit board 82 having control circuitry 84 including LED drive circuitry for controlling activation and deactivation of the light source 72. The light source 72 may include any form of light sources. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized in conjunction with the projection assembly 32. Further, various types of LEDs are suitable for use as the light source 72 including, but not limited to, top-emitting LEDs, side-emitting LEDs, and others. Moreover, according to various examples, multicolored light source 72, such as Red, Green, and Blue (RGB) LEDs that employ red, green, and blue LED packaging may be used to generate various desired colors of light outputs from a single light source 72, according to known light color mixing techniques.

Referring still to FIG. 4, the projection assembly 32 includes an optical member 86 that is optically coupled with the light source. The optical member 86 may be disposed within the housing 80 and/or may be integrally formed with the housing 80. It will be appreciated that any optical member 86 or optical members 86 may be optically coupled with the light source without departing from the scope of the present disclosure. Further, an inner wall 88 of the housing 80 may include tracks or rails over which the optical member 86 can travel back and forth in the direction of the arrow 90 shown in FIG. 4. It will also be appreciated that the optical member 86 may be any device configured to refract, collimate, reflect, and/or otherwise direct light in a predefined direction without departing from the teachings provided herein. The optical member 86 may also move and/or pivot in any direction without departing from the teachings provided herein.

A light beam 92 (excitation light 24) emitted from the light source 72 can be a monochromatic beam of light, such as a laser, and accordingly, the light beam 92 can be a laser beam, configured to deliver a specific wavelength of excitation light. This wavelength establishes a laser's color, as seen by the eye, by emitting light in a single, narrow beam. Furthermore, the laser adopted in the lamp assembly 24 may be modulated for human viewing and/or partially and/or wholly non-visible to the human eye and application and may have no or negligible effects to those who may view the light. In other examples, any other type of light source 72 may be utilized, including red, blue, and green packaged LEDs.

The optical member 86 may include interchangeable lenses and can be at least one of a concave lens, convex lens, cylindrical lens, an impression or projection specific optical member 86 and/or reflective member, depending upon the usability and application. Optical members, such as the optical member 86, may enable one to direct light at discrete positions on the window 50 to excite the luminescent structure 10 therein. In addition, the optical member 86 may include a Fresnel lens composed of a number of small lenses arranged to make a lightweight lens of large diameter and short focal length suitable to be employed for laser projections according to some examples of the present disclosure.

During an operation of the lamp assembly 24, the light source 72 emits respective light beams 92 that reach the optical member 86. Subsequently, the optical member 86, receiving the light beam 92, refracts the beam 92, causing the beam to form refracted rays 94, while enabling the beam 92 to travel either in its original direction or deflect, all based according to the beam's angle of incidence on the optical member 86. The refracted rays 94 are directed at discrete positions on the window 50 causing the luminescent structure 10 at that position to become excited and emit light in the visible spectrum. As provided herein, in some examples, perovskite-enhanced quantum dots may be utilized as the luminescent structure 10, which provides a discrete "point-based" illumination when compared to other luminescent structures 10 having more diffusive characteristics.

In some examples, outwardly directed indicia 74 may be disposed on the window 50 when the vehicle 28, and/or the rear seat assembly 96 (FIG. 3), is unoccupied and inwardly directed indicia 74 when the vehicle 28 and/or the rear seat assembly 96 is occupied. Additionally, in some examples, while the vehicle 28 is in motion, which may be detected by any practicable sensor within the vehicle 28, the vehicle 28 may receive wireless signals, such as Bluetooth low energy (BLE) signals from one or more electronic devices 76 remotely disposed from the vehicle 28. Moreover, in various instances, the indicia 74 may include, but is not limited to, an estimated time to inputted destination; if the vehicle 28 is a pooled ride, the indicia 74 may provide a time until the vehicle 28 is stopped to pick up an additional occupant; indicia 74 regarding in-vehicle feature/functionality (e.g., audio settings, climate settings, seat settings, etc.); indicia 74 regarding the use/non-use of vehicle safety systems, such as seat belts; indicia 74 regarding additional safety systems, such as an emergency brake of the vehicle 28 and when it is an appropriate system to utilize; etc.

Figure 5:
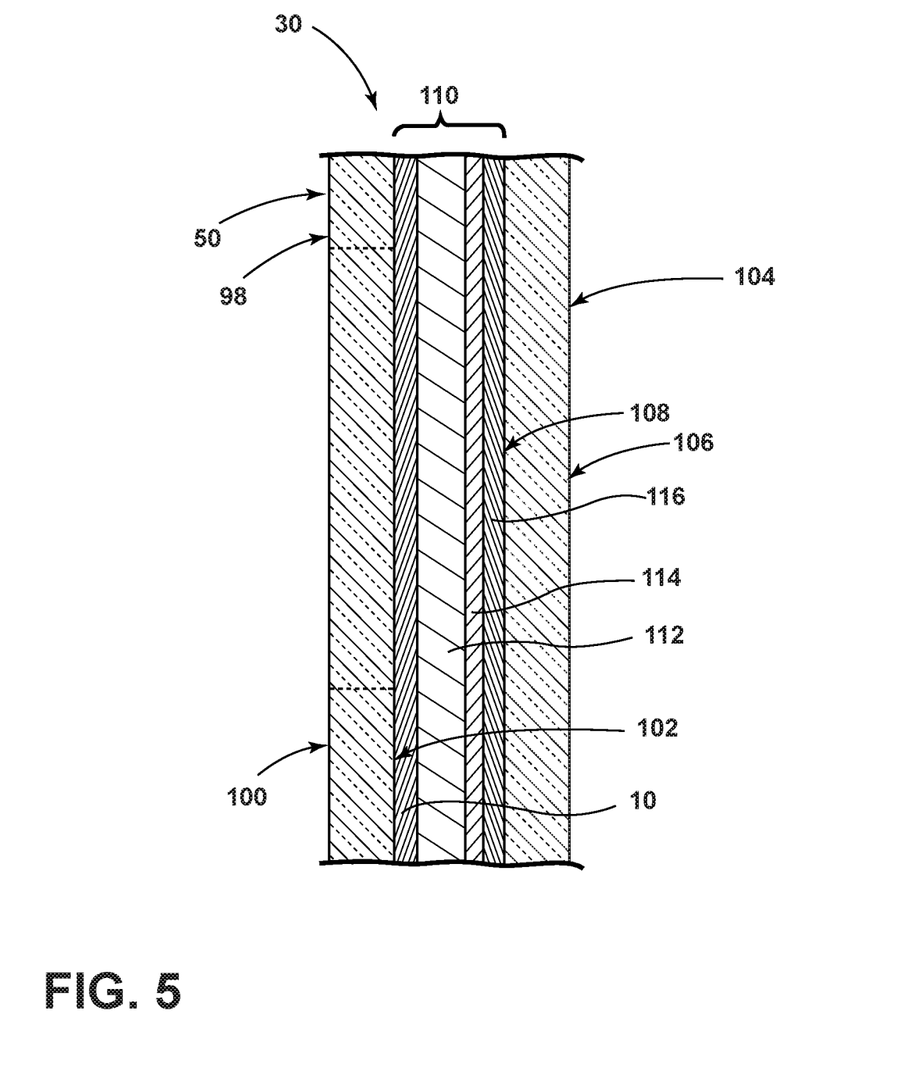
FIG. 5 is a cross-sectional view of a window of the vehicle taken along the line V-V of FIG. 2.

Referring to FIG. 5, the window 50, which is shown in an enlarged view for illustrative purposes, includes a first or outer transparent and/or translucent panel 98. The outer panel 98 has a first side 100 or outer surface and a second side 102 or inner surface. The window 50 may also include a second or inner transparent and/or translucent panel 104. The inner panel 104 has a third side 106 or outer surface and a fourth side 108 or inner surface. The outer panel 98 and inner panel 104 are spaced from each other by a gap 114 therebetween of a predetermined thickness. It will be appreciated that each component of the window 50 provided herein may be of any thickness without departing from the scope of the present disclosure.

The luminescent structure 10 may be formed as a layer and/or discrete portions that is disposed on the inner surface of the outer panel 98. A transparent member 112 may be disposed between the outer and inner panels 98, 104 and on an opposing side of the luminescent structure 10 from the outer panel 98 or the inner panel 104. The transparent member 112 may be formed from a rigid material that is comprised of a curable substrate such as a polymerizable compound, a mold in clear (MIC) material or mixtures thereof. Acrylates are also used for forming rigid light pipes, as well as poly methyl methacrylate (PMMA), which is a known substitute for glass. A polycarbonate material may also be used in an injection molding process to form the rigid transparent member 112. Additionally, a material containing polyvinyl butyral (or PVB) may be used due to its binding capabilities, optical clarity, and adhesion to many surfaces, toughness, and flexibility. Further, the transparent member 112 may be a flexible light guide, wherein a suitable flexible material is used to create the transparent member 112. Such flexible materials include urethanes, silicone, thermoplastic polyurethane (TPU), or other like optical grade flexible materials. Whether the transparent member 112 is flexible or rigid, the transparent member 112, when formed, is substantially optically transparent and/or translucent and capable of transmitting excitation light 24. The transparent member 112 may be referred to as a light pipe, a light plate, a light bar or any other light carrying or transmitting substrate made from a clear or substantially translucent material.

With further reference to FIG. 5, a reflective layer 114, which may be configured as a film, is disposed between the outer and inner panels 98, 104 and may be configured to reflect a portion and/or substantially all UV light directed thereat. In some examples, a reflective material may be disposed on an interior and/or an exterior surface of a film through any method known in the art, including, but not limited to, sputter deposition, vacuum deposition (vacuum evaporation coating), electroplating, and/or printing onto the film. The reflective layer 114 may be chosen from a wide range of materials and/or colors, including, but not limited to, silver, chrome, copper, bronze, gold, or any other colored surface. Additionally, an imitator of any metallic material may also be utilized without departing from the teachings provided herein. The reflective layer 114 may be configured to increase the efficiency of the luminescent structure 10 by reflecting excitation light 24 back at the luminescent structure 10. Similarly, the converted light from the luminescent structure 10 may also be reflected off the reflective layer 114 and redirected outwardly thereby also increasing the efficiency of the illumination assembly 30. Moreover, the reflective layer 114 may also reduce glow to occupants disposed within the vehicle 28.

A protective layer 116 may be positioned between the luminescent structure 10 and the inner panel 104. The protective layer 116 may be formed of any practicable transparent and/or translucent material known in the art and may absorb UV light, and/or any other excitation light, emitted from the light source 72 thereby preventing most excitation light from entering the vehicle 28 through the window 50. In other examples, the protective layer 116 may be configured to absorb light of any other wavelength, or multiple wavelengths. In some instances, the illumination assembly 30 may not include the protective layer 116 without departing from the scope of the present disclosure. Alternatively, the protective layer 116 may allow UV light, or any other desired wavelength of light, to pass therethrough.

Referring to FIG. 6, the vehicle 28 may be a manually operated vehicle (i.e. using a human driver) or may be autonomously driven by the onboard computer 46. Additionally, or alternatively, the vehicle 28 may be remotely controlled (e.g., via an operator located in a different location). The vehicle 28 generally includes the computer 46 having a processor 58 and a memory 60, the memory 60 including one or more forms of computer-readable media, and storing instructions executable by the processor 58 for performing various operations. The computer 46 may generally be configured for communications on a controller area network (CAN) bus or the like. The computer 46 may also have a connection to an onboard diagnostics connector (OBD-II). Via the CAN bus, OBD-II, and/or other wired or wireless mechanisms, the computer 46 may transmit messages to various devices in the vehicle 28 and/or receive messages from the various devices, e.g., controllers, actuators, sensors, electronic devices, etc., including data collectors. In addition, the computer 46 may be configured for communicating with a network, which may include various wired and/or wireless networking technologies, e.g., cellular, Bluetooth, wired and/or wireless packet networks, etc.

The computer 46 may include a dedicated or shared controller and may include the processor 58 and memory 60, according to some examples. It should be appreciated that the computer 46 may include control circuitry 84 such as analog and/or digital control circuitry. The memory 60 may include one or more routines, such as a driving mode routine 120, a light control routine 122, a data aggregation routine 124, and/or a location sensing routine 126. According to some examples, the driving mode routine 120 may determine whether the vehicle 28 is being operated in an autonomous mode and/or a manual mode. The light control routine 122 may illuminate the light source 72 in a plurality of wavelengths. The data aggregation routine 124 may use detected data to determine which information and/or advertisements are projected by the illumination assembly 30. The location sensing routine 126 may be used to determine a location and/or any other data from a remote electronic device 76 disposed proximate the vehicle 28.

A variety of vehicle equipment 130 may be in communication with the computer 46. For example, various controllers 118 in the vehicle 28 may operate as data collectors to provide data via the CAN bus, e.g., data relating to vehicle speed, acceleration, etc. Further, sensors or the like, global positioning system (GPS) equipment, navigation systems 132, etc., could be included in the vehicle 28 and configured as data collectors to provide data to the computer 46, e.g., via a wired or wireless connection. Data provided by the sensor assembly 40 could include mechanisms such as RADAR, LIDAR 48 (FIG. 2), and sonar, etc. sensors that could be deployed to measure a distance between the vehicle 28 and other vehicles or objects. In some examples, the sensor assembly 40, or any other system on the vehicle 28, may detect if passing and/or passed vehicles are happening at speeds below a predefined speed (e.g., ten miles per hour or less). If the passing vehicle is traveling below the predefined speed, the illumination assembly 30 may be activated on the outside panel of the window 50 when the vehicle 28 is disposed within a predefined distance (e.g., 20 feet or less). If the proximate vehicles are passing the vehicle 28 employing the illumination assembly 30 at speeds greater than the predefined speed, the illumination system may remain deactivated. Such a system of dynamically illuminating indicia 74 on the window 50 may make the indicia 74 more noticeable than continually providing the indicia 74 as attention by persons proximate the vehicle 28 may be drawn to the change in illumination. Additionally, when the indicia 74 is illuminated, the projection assembly 32 may remain illuminated for a predefined amount of time, such as, but not limited to, 5-10 seconds, which may provide a quick and effective advertisement. Yet other sensor data collectors could include cameras, breathalyzers, motion detectors, etc., i.e., data collectors to provide data for evaluating a condition or state of a vehicle operator. In addition, the data collectors may include sensors to detect a position, a change in position, a rate of change in position, etc., of vehicle components such as a steering wheel, brake pedal, accelerator, gearshift lever, etc.

With continued reference to FIG. 6, the computer 46 may communicate with the vehicle equipment 130 to receive information and illuminate the illumination assembly 30 based on the provided information. In the depicted examples, the vehicle equipment 130 includes the navigation system 132, a body control module (BCM) 134, a human-machine interface (HMI) 136, a display 138, a powertrain control module (PCM) 140, a light sensor 142, a steering sensor 144, a seat sensor 146, and/or camera 148, each of which provides data to the computer 46 that may be used to determine the operation of the illumination assembly 30. For example, the navigation system 132 may provide the computer 46 and/or the controller 118 with information related to the progress of a trip (e.g., ETA, distance, etc.). The navigation system 132 may also cooperate with the illumination assembly 30 such that the illumination assembly 30 is illuminated as the vehicle 28 begins to operate and/or move in an autonomous mode. Moreover, the navigation system 132 may provide location-based information and/or advertisements to a person proximate the vehicle 28.

The BCM 134 and/or PCM 140 may provide the computer 46 with information related to the vehicle 28 such as a door status (e.g., locked/unlocked), a seat belt status (e.g., buckled/unbuckled), a vehicle speed, etc., to determine whether a person is disposed within the vehicle 28 and/or operating (or capable of operating) the vehicle 28.

With further reference to FIG. 6, the vehicle 28 may additionally include the HMI 136 that may be used for controlling a plurality of functions within the vehicle 28, including, but not limited to, air conditioning settings, seat settings, sound settings, and/or navigational settings. The HMI 136 may also include a display 138 that may provide any desired information about the settings and/or any other information about the vehicle 28. The display 138 may also provide any desired information about the illumination assembly 30. Moreover, the display 138 may provide information pertaining to the current trip while the vehicle 28 is in operation. Moreover, the internal display may additionally include advertising information.

The seat sensor 146, which includes, but is not limited to, any type of proximity sensor, seat airbag sensor, pressure sensor, etc., may be utilized for detecting the presence and/or location of occupants within the vehicle 28. For example, if the vehicle 28 is to pick up an occupant, the illumination assembly 30 may direct the incoming occupant to a vacant location within the vehicle 28. The illumination assembly 30 may direct the incoming occupant towards a position within the vehicle 28 by illuminating the respective door 36A, 36B proximate the location and/or the ground surface 52 proximate the desired location within the vehicle 28. In addition to the seat sensor, one or more cameras 148 may be disposed within and/or on an exterior portion of the vehicle 28 that may be capable of imaging activities proximate the vehicle 28. In some instances, the cameras 148 within the vehicle 28 may be capable of detecting a looking direction of an occupant and illuminating indicia 74 in the direction in which the occupant is looking to reduce the number of advertisements and/or illumination about the vehicle 28.

In some examples, the vehicle 28 includes a light sensor 142 that may be utilized for varying the intensity of light 26 emitted from the illumination assembly 30. The light sensor 142 detects the environmental lighting conditions, such as whether the vehicle 28 is in day-like conditions (i.e., higher light level conditions) and/or whether the vehicle 28 is in night-like conditions (i.e., lower light level conditions). The light sensor 142 can be of any suitable type and can detect the day-like and night-like conditions in any suitable fashion. According to some examples, the colors of light and/or intensities of light emitted from the illumination assembly 30 may be varied based on the detected conditions. The light sensor 142 may be integrated into the vehicle 28 or into the illumination assembly 30. Moreover, the intensity of excitation light 24 may additionally, or alternatively, be varied with the initiation of the vehicle's headlights.

In some instances, the vehicle computer 46 may use the vehicle equipment to capture sensor data from which real-time information about the context in which the vehicle 28 is located may be derived. For example, one or more cameras 148 within the vehicle 28 might capture images or video of persons and/or vehicles proximate the vehicle 28 and the camera 148 might communicate with the illumination assembly 30.

With further reference to FIG. 6, the vehicle 28 may further include one or more wireless communication transceivers 128 that may be configured to interact with the electronic device 76. The wireless communication transceivers 128 may communicate with the electronic device 76 over a wireless signal (e.g., radio frequency). In one non-limiting example, the wireless communication transceivers 128 may be a Bluetooth™ RN4020 module, or an RN4020 Bluetooth™ low energy PICtail board configured to communicate with the electronic device 76 using Bluetooth™ low energy signals. The wireless communication transceivers 128 may include a transmitter and a receiver to transmit and receive wireless signals (e.g., Bluetooth™ signals) to and from the electronic device 76. It will be appreciated that the wireless communication transceivers 128 may utilize other forms of wireless communication between the electronic device 76 and other wireless communication transceivers 128 such as Wi-Fi™.

In various examples, the wireless communication transceiver 128 is a stand-alone device that is not in communication with body control modules, electronic control modules, engine control modules and/or other features of the vehicle 28. For example, the wireless communication transceivers 128 may only be capable of communication with the illumination assembly and/or the lamp assembly and the electronic device 76. In other embodiments, the wireless communication transceivers 128 may communicate with a body controller and/or other onboard controllers. The wireless communication transceivers 128 may communicate with one or more transceivers disposed within the belongings of an occupant and/or on remotely disposed positions. Accordingly, the computer 46 may utilize the data provided by the one or more electronic devices 76 and/or the vehicle equipment 130 to aggregate data and determine the most relevant information and/or advertisements to display to an occupant of the vehicle 28 and/or a person disposed proximately to the vehicle 28.

The real-time information is then used to generate or determine an aggregate audience profile that represents one or more demographic characteristics of the target audience disposed within and/or externally from the vehicle 28. The information and/or advertising content may be selected for presentation by the controller 118 based at least in part on an aggregate audience profile. That is, the aggregate audience profile may be used to identify targeted advertisements designed to appeal to all or a portion of the target audience as represented by the demographic information included in the profile as generated by the data aggregation routine 124. As will be appreciated, there are a large number of techniques by which this can be done, all of which may be used with implementations enabled by this disclosure.

In addition to, and/or in lieu of, advertising information, the illumination assembly may also project rider information onto the window 50 of the vehicle 28. For example, when multiple occupants who do not know each other are riding in a common vehicle 28, the illumination assembly may provide an image of a correct additional rider such that other vehicle occupants may confirm that the correct incoming occupant enters the vehicle 28. In instances in which the incoming occupant does not match the image on the window 50, one or more occupants may utilize a safety device or measure to protect against unwelcome occupants, such as an emergency lockout system.

With further reference to FIG. 6, the light source 72 may illuminate one or more indicia 74, which may be defined by one or more luminescent structures 10. In response, the luminescent structures 10 may be configured to convert excitation light 24 received from the associated light source 72 into light having a wavelength in the visible spectrum. In some examples, a plurality of luminescent structures 10 may produce luminescence in response to a different wavelength of excitation light 24 emitted from the light source 72. Accordingly, the one or more indicia 74 may independently and/or contemporaneously luminesce. In operation, the indicia 74 may direct an occupant to a desired location within the vehicle 28, as provided herein. Additionally, and/or alternatively, the indicia 74 may provide any other desired information to persons proximate the vehicle 28, including, but not limited to, a company that is transporting occupants, a symbol to signify the correct vehicle 28 to an occupant, or any other information for an incoming occupant.

In some examples, the light source 72 may emit significant intensities of excitation light 24 to ensure that the luminescent structure 10 is luminescing near the full capacity of the luminescent structure 10 such that the indicia 74 are visible during all conditions. Since lighting conditions may vary depending on a plurality of factors including, but not limited to, the current time, date, and weather conditions, the intensity of excitation light 24 emitted from the light source 72 may be adjusted by the computer 46 such that illumination of the luminescent structure 10 may be noticed under any condition. For example, the light intensity in Florida during a clear summer afternoon will generally be higher than the light intensity in Michigan during an overcast winter morning. Thus, by making this type of information known to the computer 46, the computer 46 can adjust any light source 72.

According to various examples, the luminescent structure 10 discussed herein is substantially Lambertian, that is, the apparent brightness of the luminescent structure 10 is substantially constant regardless of an observer's angle of view. As described herein, the color of the converted light 26 may be significantly dependent on the particular luminescent materials 18 utilized in the luminescent structure 10. Additionally, a conversion capacity of the luminescent structure 10 may be dependent on a concentration of the luminescent material 18 utilized in the luminescent structure 10. By adjusting the range of intensities that may excite the luminescent structure 10, the concentration, types, and proportions of the luminescent materials 18 in the luminescent structure 10 discussed herein may be operable to generate a range of color hues of the excitation light 24 by blending the first wavelength with the second wavelength.

As described herein, the color of the converted light 26 may be significantly dependent on the particular luminescent material 18 utilized in the luminescent structure 10. Additionally, a conversion capacity of the luminescent structure 10 may be significantly dependent on a concentration of the luminescent materials 18 utilized in the luminescent structure 10. By adjusting the range of intensities that may be emitted from the light source 72, the concentration and proportions of the luminescent materials 18 in the luminescent structure 10 and the types of luminescent materials 18 utilized in the luminescent structure 10 discussed herein may be operable to generate a range of color hues of outputted light by blending the excitation light 24 with the converted light 26. It is also contemplated that the intensity of the light source 72 may be varied simultaneously, or independently, from any number of other light sources 72.

A variety of advantages may be derived from the use of the present disclosure. For example, the illumination assembly projects light onto the vehicle and/or a window of the vehicle, which may generate indicia. The illumination assembly includes a projection assembly that may be activated when an approaching vehicle passes the illumination assembly below a predefined speed to provide indicia and/or advertisements to persons within the approaching vehicle and/or persons proximate the illumination assembly. The projection assembly may selectively illuminate indicia on the window in a first orientation when the vehicle is unoccupied and a second, opposing orientation when the vehicle is occupied. The illumination assembly can save significant costs, resources, and materials while adding additional illumination to the vehicle.

According to various examples, an illumination assembly is provided herein. The illumination assembly includes a projection assembly disposed within a housing extending from a portion of a vehicle. A window is disposed on the vehicle and optically coupled with the projection assembly. A luminescent structure is disposed within the window and excited by the projection assembly. A controller is configured to activate the projection assembly to selectively illuminate indicia on the window. Examples of the illumination assembly can include any one or a combination of the following features:

the controller is configured to aggregate data about persons proximate the vehicle and determine a targeted advertisement;

the indicia are inwardly facing when the vehicle is occupied and outwardly facing when the vehicle is unoccupied;

a camera configured to detect a looking direction of an occupant and the window proximate the looking direction is illuminated;

the projection assembly includes a laser and optics optically coupled with the laser;

the luminescent structure is formed from perovskite-enhanced quantum dots;

wherein the window includes an inner panel and an outer panel and the luminescent structure is disposed with the inner and outer panels;

a transparent elongated member disposed within the luminescent structure and the inner panel;

a light filter disposed between the luminescent structure and the inner panel;

a reflective film disposed between the luminescent structure and the inner panel; and/or the projection assembly is activated when an approaching vehicle passes the illumination assembly below a predefined speed.

Moreover, a method of manufacturing an illumination assembly is provided herein. The method includes positioning a projection assembly within a housing extending from a portion of a vehicle. The method also includes optically coupling a window with the projection assembly. The methods further includes disposing a luminescent structure within the window. Lastly, the method includes coupling the projection assembly with a controller configured to activate the projection assembly to selectively illuminate indicia on the window.

According to some examples, an illumination assembly is provided herein. The illumination assembly includes a projection assembly disposed within a housing disposed on an exterior portion of a vehicle. The projection assembly is activated when an approaching vehicle passes the illumination assembly below a predefined speed. A window is disposed on the vehicle and optically coupled with the projection assembly. A luminescent structure is disposed within the window and excited by the projection assembly. Examples of the illumination assembly can include any one or a combination of the following features:

a controller configured to activate the projection assembly to selectively illuminate indicia on the window;

a transparent elongated member disposed between the luminescent structure and the inner panel; and/or a light filter disposed between the luminescent structure and the inner panel.

According to other examples, an illumination assembly is provided herein. The illumination assembly includes a window optically coupled with a projection assembly. A luminescent structure is disposed within the window and excited by the projection assembly. A controller is configured to activate the projection assembly to selectively illuminate indicia on the window in a first orientation when the vehicle is unoccupied and a second, opposing orientation when the vehicle is occupied. Examples of the illumination assembly can include any one or a combination of the following features:

a camera configured to detect a looking direction of the occupant and the window proximate the looking direction is illuminated;

the projection assembly includes a laser and optics optically coupled with the laser;

wherein the luminescent structure is formed from perovskite-enhanced quantum dots; and/or a reflective film disposed between the luminescent structure and the inner panel.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An illumination assembly, comprising:
    a projection assembly disposed within a housing extending from a portion of a vehicle;
    a window disposed on the vehicle and optically coupled with the projection assembly, wherein the window includes an inner panel and an outer panel;
    a luminescent structure disposed within the inner and outer panels of the window and excited by the projection assembly;
    a light filter disposed between the luminescent structure and the inner panel; and
    a controller configured to activate the projection assembly to selectively illuminate indicia on the window.

2. The illumination assembly of claim 1, wherein the controller is configured to aggregate data about persons proximate the vehicle and determine a targeted advertisement.

3. The illumination assembly of claim 1, wherein the indicia are inwardly facing when the vehicle is occupied and outwardly facing when the vehicle is unoccupied.

4. The illumination assembly of claim 1, further comprising:
    a camera configured to detect a looking direction of an occupant and the window proximate the looking direction is illuminated.

5. The illumination assembly of claim 1, wherein the projection assembly includes a laser and optics optically coupled with the laser.

6. The illumination assembly of claim 1, wherein the luminescent structure is formed from perovskite-enhanced quantum dots.

7. The illumination assembly of claim 1, further comprising:
    a transparent elongated member disposed within the luminescent structure and the inner panel.

8. The illumination assembly of claim 1, further comprising:
    a reflective film disposed between the luminescent structure and the inner panel.

9. The illumination assembly of claim 1, wherein the projection assembly is activated when an approaching vehicle passes the illumination assembly below a predefined speed.

10. An illumination assembly, comprising:
    a projection assembly disposed within a housing disposed on an exterior portion of a vehicle, wherein the projection assembly is activated when an approaching vehicle passes the illumination assembly below a predefined speed;
    a window disposed on the vehicle and optically coupled with the projection assembly;
    a luminescent structure disposed within the window and excited by the projection assembly;

a transparent elongated member disposed between the luminescent structure and an inner panel of the window; and a light filter disposed between the luminescent structure and the inner panel.

11. The illumination assembly of claim 10, further comprising:

a controller configured to activate the projection assembly to selectively illuminate indicia on the window.

12. An illumination assembly, comprising:

a window optically coupled with a projection assembly, wherein the window includes an inner panel and an outer panel;

a luminescent structure disposed within the window and excited by the projection assembly, wherein the luminescent structure is disposed within the inner and outer panels;

a controller configured to activate the projection assembly to selectively illuminate indicia on the window in a first orientation when the vehicle is unoccupied and a second orientation opposite the first orientation when the vehicle is occupied; and a reflective film disposed between the luminescent structure and the inner panel.

13. The illumination assembly of claim 12, further comprising:

a camera configured to detect a looking direction of the occupant and the window proximate the looking direction is illuminated.

14. The illumination assembly of claim 12, wherein the projection assembly includes a laser and optics optically coupled with the laser.

15. The illumination assembly of claim 12, wherein the luminescent structure is formed from perovskite-enhanced quantum dots.

* * * * *